US005508877A

United States Patent [19]

Smith

[11] Patent Number: 5,508,877

[45] Date of Patent: Apr. 16, 1996

[54] WEATHERPROOF TELEPHONE STATION PROTECTORS

[75] Inventor: Thomas J. Smith, Bay Shore, N.Y.

[73] Assignee: Tii Industries Inc., Copiague, N.Y.

[21] Appl. No.: 140,863

[22] Filed: Oct. 25, 1993

[51] Int. Cl.[6] .......... H02H 3/22

[52] U.S. Cl. .......... 361/119; 361/129

[58] Field of Search .......... 361/119, 117–118, 361/124, 111–112, 56, 91, 129

[56] References Cited

U.S. PATENT DOCUMENTS

| | | | |
|---|---|---|---|
| 5,224,013 | 6/1993 | Pagliuca | 361/119 |
| 5,317,474 | 5/1994 | Capper et al. | 361/119 |

*Primary Examiner*—A. D. Pellinen
*Assistant Examiner*—Michael J. Sherry
*Attorney, Agent, or Firm*—Martin Sachs

[57] ABSTRACT

A telephone station protector module suitable for exposure to weather includes an elongated lower hollow housing member has a longitudinal and a transverse axis. The top surface includes a pair of terminal assemblies with the front and rear surfaces parallel to the module's longitudinal axis and include an elongated through aperture and an open bottom. Each terminal assembly includes a pair of hollow rectangularly shaped upper housing members having a top surface with an aperture adapted to receive a threaded bolt. Two side surfaces parallel to the transverse axis are provided with a plurality of apertures suitable for receiving insulated wires therein. The other two parallel sides surfaces are provided with an outwardly extending protrusion for cooperating with the bottom member elongated aperture. The terminal assembly also includes a generally U-shaped conducting contact, which has a pair of arm portions and a base portion. Each arm portion is provided with at least one cutting slot in alignment with the apertures for receiving the insulated wires therein. A pair of conducting feedthroughs have internal threads on one end for receiving the bolt therein. The threaded end of the feedthrough is retained by the lower housing member aperture and extends into the hollow portion of the housing. Rotating the threaded bolt urges the top housing member into the lower housing member, wherein the insulated wires inserted into the side through apertures into the slots of the U-shaped contacts complete a conductive path therebetween.

44 Claims, 3 Drawing Sheets

FIGURE I

WEATHERPROOF TELEPHONE STATION PROTECTORS

BACKGROUND OF THE INVENTION

1. Field of the Invention

The present invention relates to waterproof telephone station protector modules suitable for use outside exposed to the weather, and more particularly, to a weatherproof station protector module that includes overvoltage protection and includes a back-up air gap should the overvoltage protection fail.

2. Discussion of the Relevant Art

There are numerous overvoltage protection devices that include back-up protectors, which are suitable for use on a telephone communication system. However, a miniature assembly, which includes means for connecting insulated conductive wires together and in addition provide overvoltage protection thereto including a back-up air gap and suitable for use outdoors is not well known. The size of the present protection module is relatively small and easy to assemble.

Therefore, it is an object of the present invention to provide a relatively low cost, reliable and efficient means for connecting two wires together and provide overvoltage protection for this connection.

It is another object of the present invention to provide a weatherproof terminal assembly with overvoltage protection to which insulated wires of different sizes may be connected.

It is still yet another object of the present invention wherein insulated wires of different sizes may be connected together requiring no special techniques, solder, or other special tools and further includes overvoltage protection together with a back-up air gap.

Therefore, the present invention provides an apparatus, which is small in size, overcomes the shortcomings of the prior art, and is capable of insuring reliable electrical connection between the plurality of insulated electrically conductive wires and provide overvoltage protection with a back-up air gap to this connection point and is impervious to weather conditions.

SUMMARY OF THE INVENTION

A weatherproof telephone station protector module suitable for outside use exposed to the weather includes, according to the principles of the present invention, an elongated lower housing member which has a longitudinal axis and a transverse axis and a top surface including a pair of terminal assemblies disposed thereon. A pair of through apertures is disposed proximate to the edges of the lower housing member and is adapted to cooperate with the terminal assemblies. The front and rear surfaces are disposed parallel to the longitudinal axis and are provided with an elongated through aperture and an open bottom. Each of the terminal assemblies include a hollow, rectangularly shaped upper housing member having a top surface and a open bottom. The top surface is provided with a generally centrally disposed through aperture. Said upper housing member is adapted to cooperate with and be removably retained by the lower housing member. The two parallel side surfaces are disposed parallel to the transverse axis and are provided with a plurality of through apertures. The other two parallel side surfaces are provided with an outwardly extending protrusion adapted to cooperate with the bottom member elongated through aperture for removably retaining the upper housing member to the lower housing member. A hollow electrically conductive feedthrough has internal threads on one end, is retained by said lower housing member through aperture disposed proximate the edge of the lower member and the through aperture of the U-shaped base portion of said conductive contact so that said upper housing member and said lower housing member are in alignment. A bolt is adapted to be received into the generally centrally disposed through aperture of the upper housing member and be received by the threaded one end of the threaded feed through disposed in the lower housing member and cooperate therewith for urging the top housing member to be received by said lower housing member so that when electrically conductive insulators are inserted into the side through apertures of the upper housing member into the slots of the U-shaped contact an electrically conductive path is completed therebetween upon urging the upper housing member and said lower housing member together.

The foregoing and other objects and advantages will appear from the description to follow. In the description, reference is made to the accompanying drawing, which forms a part hereof, and which is shown by way of illustration and a specific embodiment in which the invention may be practiced. This embodiment will be described in sufficient detail to enable those skilled in the art to practice the invention, and it is to be understood that other embodiments may be utilized and structural changes may be made without departing from the scope of the invention.

The following detailed description is, therefore, not to be taken in a limiting sense, and the scope of the present invention is best defined by the appended claims.

The subject matter which I regard as my invention is particularly pointed out and distinctly claimed in the concluding portion of the specification. My invention, itself, however, both as to its organization and method of operation, together with further objects and advantages thereof may best be understood by reference to the following description taken in connection with the accompanying drawing wherein the primed numbers refer to identical elements or components utilized in the same manner as the originally designated component.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENTS

Figure 1:
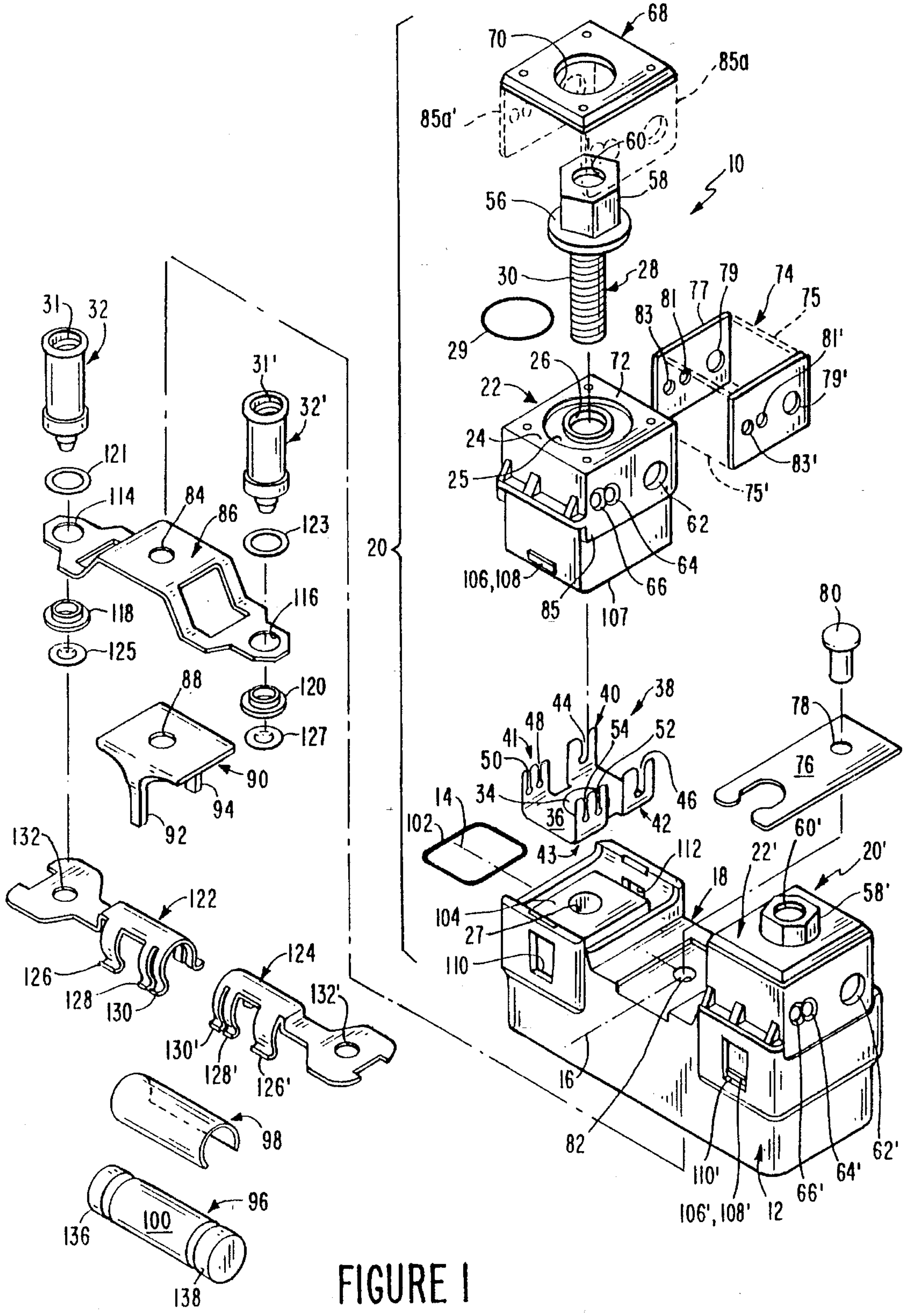
FIG. 1, is an isometric view of the partially exploded weatherproof station protection module, according to the principles of the present invention.

Referring now to the figures, and in particular FIG. 1, which is an partially exploded view of a weatherproof telephone station protection module 10 and is seen to include an elongated lower hollow housing member 12 having a longitudinal axis 14 and a transverse axis 16. On the top surface 18 of the lower housing member 12 there is provided a pair of terminal assemblies 20 and 20'. Terminal 20, which is shown as the exploded portion of the weatherproof station protector module in FIG. 1 is identical to the terminal assembly 20', which is shown in its closed position Therefore, when the components of terminal 20 are described it is to be understood that identical components are found in terminal 20'.

The terminal assemblies 20 and 20' include a generally rectangularly shaped hollow upper housing member 22. The top surface 24 of upper housing member 22 is provided with a generally centrally disposed through aperture 26, which is suitable for receiving a threaded bolt 28 therein and an annular groove or channel 25 adapted to receive O-ring 29 therein for providing a moisture resistant seal when the lip portion 56 of bolt 28 comes into pressure contact therewith. The lower threaded portion 30 of bolt 28 is adapted to be received into the hollow internally threaded portion of a electrically conductive feedthrough member 32, which in turn is adapted to be inserted through aperture 34 provided in the base portion 36 of the U-shaped conductive contact shorting member 38, which is provided with arms 40, 41, 42 and 43 that includes therein a plurality of insulator cutting channels 44, 46, 48, 50, 52 and 54. Channels 44 and 46 disposed in the upwardly extending arms 40 and 42 are suitable for receiving a larger diameter insulated wire, not shown, then the channels 48, 50, 52 and 54 provided in the arms 41 and 43. Arms 40 through 44 are affixed on the opposite distal edges of the base portion 36 or alternatively they may be made in one piece with the arms being folded upwardly from the base portion, as shown in FIG. 1.

The bolt 28 includes a lip portion 56 and a head portion 58, which is coated with an insulating material. An aperture 60 generally centrally disposed in the head portion 58 of bolt 28 pierces the insulation material thereby providing electrically conductive contact to the bolt 28 and to the conductive contact 38, which as will be explained hereafter, electrically connects together (shorts) the wires inserted through the apertures 62, 64 and 66 provided in the upper housing member 22 of the terminal assembly 20 and 20'. Apertures 63, 65 and 67 are provided in the opposite parallel surface of the rectangularly shaped upper housing member 22 (hidden from view) and are adapted to be in alignment with channels 44, 48 and 50. Channels 46, 52 and 54 are adapted to be in alignment with apertures 62, 64 and 66, respectively.

A top cover 68 is provided with a centrally disposed aperture 70 suitable for receiving the head portion 58 of bolt 28 and is smaller than the diameter of the lip portion 56 so that when placed upon the upper housing member top surface 72 and it being affixed thereto, in a conventional manner, will hold bolt 28 captive to the upper housing member 22, thus preventing the bolt 28 to be dropped or misplaced during assembly in the field.

An elastic resilient band member 74 is suitable for expanding and tightly covering the apertures 62, 63, 64, 65, 66 and 67 to prevent moisture from entering the terminal assemblies 20 and 20'. The insulated wires are inserted through (pierce) the resilient band 74 when connection is to be made thereby further preventing moisture from entering the connector through unused apertures. The elastic band 74 is designed to tightly engage the insulation of the wires, not shown, to be inserted into the respective apertures.

Alternatively, the upper housing 22 may be fabricated with the extending portions 85*a* and 85*a'* as part of the cover 68 and the side portions 75 and 75' shown by the broken lines, may be removed from the resilient band 74 forming two pads 77 and 77' which are provided with reduced apertures 79, 81 and 83; and apertures 79', 81' and 83'. The pads 77 and 77' are affixed to the inside walls of the extending portions 85*a* and 85*a'* of upper housing member 22 in a conventional manner, covering apertures 62, 64 and 66 and apertures 62', 64', 66', respectively, thereby providing the same moisture protection as elastic band 74. The pads 77 and 77' are preferably placed behind the extending portions 85 and 85' provided on the cover 68, while the band 74 is preferably placed over the apertures 62, 64, 66 and 62', 64' and 66' of upper housing member 22 when the cover 68 is not provided with the separate extending portions 85 and 85'.

A ground terminal member 76 is provided with an aperture proximate one end thereof that is adapted to receive a rivet 80 and extend through aperture 82 provided in the top surface 18 of the lower housing member 12. Rivet 80 extends into and through aperture 82 of the lower housing member 12 and through aperture 84 provided in bracket member 86 and aperture 88 of bracket 90 and when peened over performs the function of providing a ground within the hollow portion of the lower housing member 12 as well as on the top surface 18 of the lower housing member.

Bracket member 90 includes a pair of extending arms 92 and 94 which are suitable for retaining the three terminal overvoltage protection device 96 and the arms 92 and 94 are capable of piercing the insulator 98 providing electrical conductive contact with the central or ground terminal 100 provided on the overvoltage protection device 96 which may be a gas tube or a solid state device with a similar configuration.

An elastic resilient O-ring sealing member 102 surrounds the plateau portion 104 provided on the top surface 18 of the lower housing member 12. When upper housing member 22 is inserted within the lower housing member 12 it is positioned to be beneath the lower edges 106 of the upper housing member and thus, when the upper housing member is tightened down by bolt 28 provides a hematic seal and prevents any moisture from entering the housing. The opposite and parallel side surfaces, which are parallel to the longitudinal axis 14 of the lower housing member 12, are provided with outwardly extending protrusions 106 and 108, which are adapted to be received into elongated apertures 110 and 112 provided on the lower housing member 12 and retain the upper housing member 22 and 22' to the lower housing member 12.

The bracket 86 is provided with a pair of apertures 114 and 116 proximate the distal edges thereof, which are adapted to receive insulator shoulder eyelets 118 and 120 therein. Holding brackets 122 and 124 are provided with a plurality of fingers 126, 126' 128, 128', 130 and 130' suitable for retaining the thermal insulator 98 and the overvoltage protection device 96 therein. Brackets 122 and 124 are also provided with apertures 132 and 132' proximate their distal edges which are adapted to receive therein the internally threaded feed through members 32 and 32', respectively, which retain the brackets 122 and 122' thereon and since they are spaced by insulators 118 and 120 and insulator (dielectric) washers 121 and 123 from the bracket 186, they remain insulated from the ground terminal 76, via brackets 86 and 90 and forms a back-up air gap. The fingers 126 and 126' of brackets 122 and 124 are in electrically conductive contact with terminal 136 and 138, respectively, of the overvoltage protection device 96. The friction retainers 125 and 127 retain the bracket 86 on the feedthrough members 32 and 32', respectively. Built in friction retainers in apertures 132 and 132' of brackets 122 and 124, respectively, are adapted to be received and retained on the lower ends of feedthrough members 32 and 32'.

Figure 2:
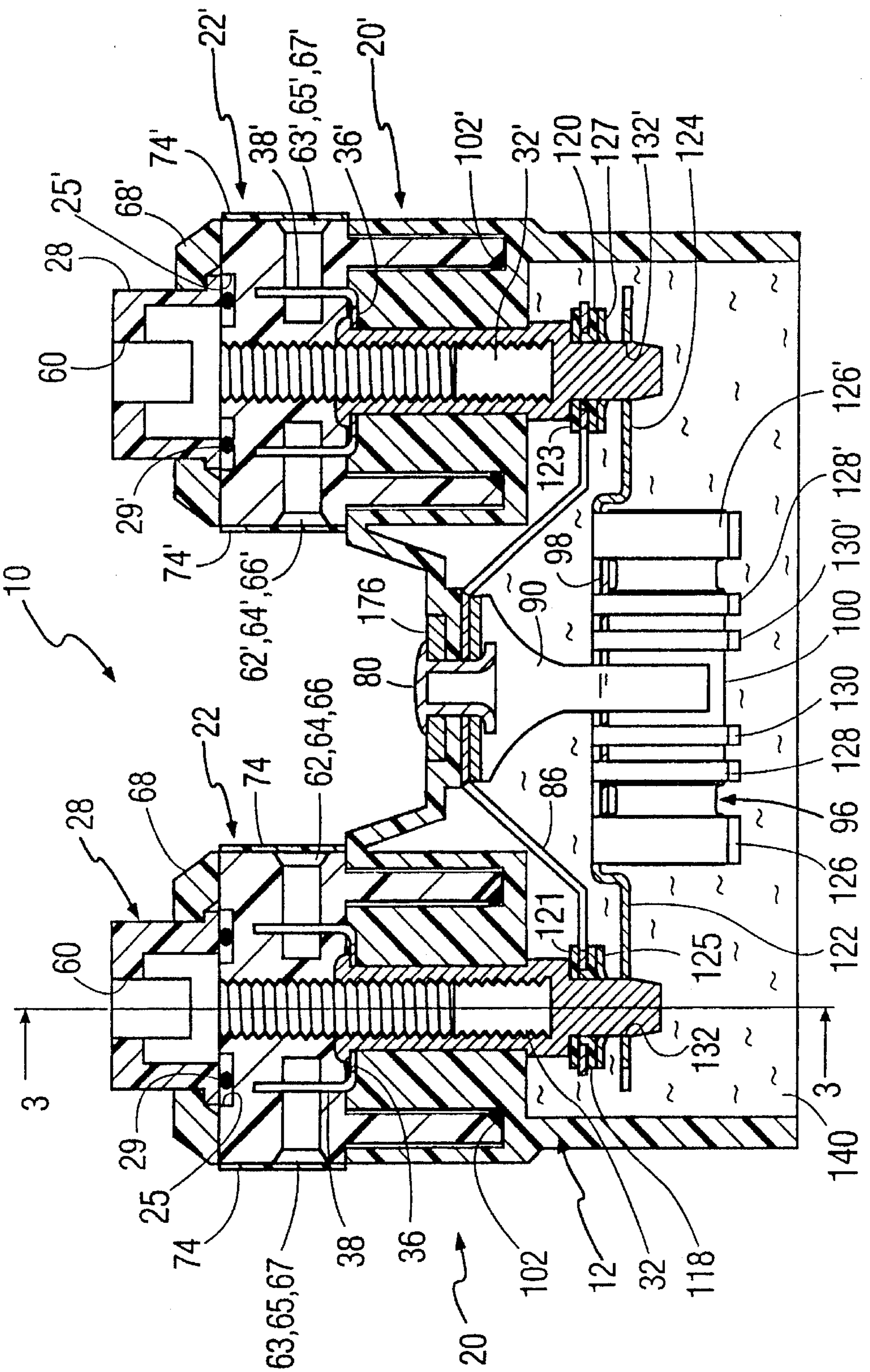
FIG. 2, is a cross-sectional view of the weatherproof telephone terminal apparatus taken along the longitudinal axis of the module.

Referring now specifically to FIG. 2, which is a view generally in cross-section taken along the longitudinal axis 14 shown in FIG. 1. The weatherproof terminal station protector module 10 is shown in its fully assembled or closed position excluding the insulated wires which are to be placed in apertures 62, 63, 64, 65, 66, and 67. These wires have been eliminated for clarity so that the mechanical configuration may be more readily determined and viewed.

Figure 3:
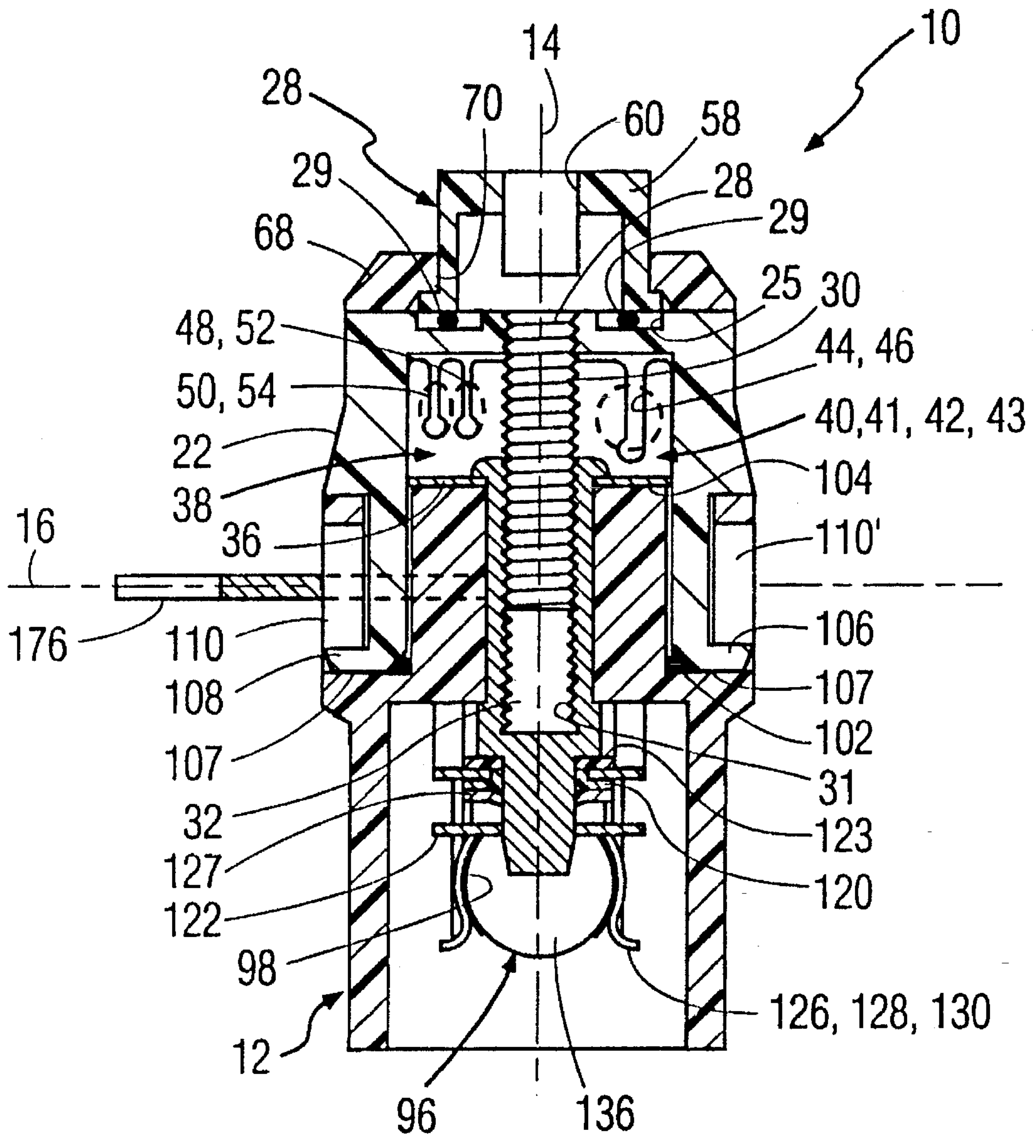
FIG. 3, is a cross-sectional view taken along the line 3—3 of FIG. 2.

Referring now specifically to FIG. 3, which is an end view in cross-section taken along the line 3—3 of FIG. 2. Hereagain, the assembly is shown completely assembled with the insulated wires eliminated for clarity.

In operation, the hollow lower housing member 12 contains the items shown at the left side of FIG. 1 with the feedthrough member 32 being electrically conductive and inserted through aperture 132 through the insulated shoulder eyelet 118 and thus is engaged and retained upon eyelet 32 and is adapted to receive the threaded portion of bolt 28 therein. In a like manner the terminal 20' is assembled with the eyelet 32' being inserted through aperture 132' with eyelet 120 being inserted into aperture 116 so that the brackets 122 and 124 are retained in position suitable to removably retain the overvoltage protection device 96 with the thermal insulator 98 therein. The fingers 92 and 94 of ground bracket 90 pierce the thermal insulation 98, thus making contact with the center terminal 100 of the overvoltage protection device 96. The rivet 80 is applied through aperture 78, 84 and 88, through aperture 114 and aperture 34 in U-shaped bracket 38 where it is then peened over in a conventional manner and retains all of the brackets in position.

The elastic band 102 is placed over the plateau 104 of the lower housing member 12. Thus, when the upper housing member 22 is placed upon the top surface of the lower housing member it is received over the plateau and will have the benefit of the O-ring member 102 placed in a narrow groove, not shown, under compression where the upper housing member is forced against the lower housing member with the O-ring members therebetween. The insulated wires, not shown, are inserted into the apertures as stated before. When the upper housing is initially assembled it is able to accept the insulated wires therein, which are positioned to be over the cutting channels 44, 46, 48, 50, 52 and 54. Thus, a single terminal is able to connect together (short) six wires of different sizes. By rotating captive bolt 28 once inserted into the internally threaded feedthrough member the top cover is moved in a downward direction, thus forcing the insulated wire into the cutting channels mentioned earlier. Since the channels are provided with a cutting edge the insulation is pierced and electrical conductive contact is made between each of the wires, via the electrically conductive contact shorting member 38. Once the cutting is started and the upper housing member is lowered the wires are forced to remain in position by the internal configuration of the upper housing member 22 thereby retaining the wires in position and shorting them together. With the configurations disclosed herein each one of the terminal assemblies are protected by an overvoltage protective device 96, as well as, a back-up air gap (see FIG. 2; dielectric 121 and 123) and a thermally sensitive member 98 which upon overheating will short the line terminals to ground.

In addition, a non-conducting water proofing gel may be applied to both embodiments disclosed herein filling the voids and preventing moisture from entering the terminal assemblies 20 and 20' or the aperture 60 disposed in the head portion 58 of the bolt 28, which functions as a test terminal. The housing member may also be filled with a potting compound 140, in a conventional manner, to complete the waterproofing of the telephone station module 10.

It will be understood that various changes in the details, materials, arrangement of parts and operating conditions which have been herein described and illustrated in order to explain the nature of the invention may be made by those skilled in the art within the principles and scope of the present invention.

Having thus set forth the nature of the invention, what is claimed is:

1. A weatherproof telephone station protector module suitable for outside use exposed to the weather comprising:

A. a lower hollow housing member having a longitudinal axis, a transverse axis, and a top surface including,
   a) at least one terminal assembly disposed thereon,
   b) at least one first through aperture adapted to cooperate with said terminal assembly,
   c) front and rear surfaces disposed parallel to said longitudinal axis, said front and rear surfaces being provided with a second through aperture, and B. each said terminal assembly including;
   a) an upper housing member having, i) a top surface provided with a generally centrally disposed third through aperture, said upper housing member being adapted to cooperate with and be removably retained by said lower housing member, ii) two parallel side surfaces disposed parallel to said transverse axis provided with at least one fourth through aperture, and iii) the other two parallel side surfaces being provided with a retaining means adapted to cooperate with a cooperating retaining means disposed on said bottom member; and
   b) a electrically conductive contact means, having i) at least one arm portion connected to a base portion, said arm portion being provided with at least one cutting slot adapted to receive an electrically conductive insulated wire therein, ii) said base portion having a fifth through aperture and being connected at one edge to said arm portion; and
   c) an electrically conductive feedthrough being adapted to be retained by said lower housing member first through aperture and said upper housing member third through aperture so that said upper housing member and said lower housing member are in alignment; and C) electrically conductive connecting means adapted to be received into said upper housing third through aperture and be received by electrically conductive means in said lower housing member and cooperate therewith for urging said top housing member to be received by said lower housing member; wherein, when electrically conductive insulated wires are inserted into said fourth through aperture of said upper housing member into said cutting slot of said electrically conductive contact an electrically conductive path is completed therebetween upon urging said upper housing member and said lower housing member together.

2. A weatherproof telephone station protector module suitable for outside use exposed to the weather, according to claim 1, further including resilient washer means disposed beneath the bottom edges of said terminal assembly when received by said lower member.

3. A weatherproof telephone station protector module suitable for outside use exposed to the weather, according to claim 1, wherein said upper housing member of said terminal assembly is adapted to be received into said lower housing member.

4. A weatherproof telephone station protector module according to claim 1, wherein said electrically conductive contact means has a pair of arms and a base portion forming a U-shaped member, said arms having distal extending ends, said ends being provided with ledges adapted to cooperate with a ledges provided on said upper housing member of said terminal assembly to prevent said upper housing member from shearing said electrically conducting wires.

5. A weatherproof telephone station protector module according to claim 1, wherein said electrically conductive connecting means is a bolt held captive within said upper housing member and said upper housing member is removably retained within said lower housing member, said captive bolt being adapted to be inserted into said upper housing third through aperture member and be received by said electrically conductive feedthrough disposed in said lower housing member and cooperate therewith for urging said top housing member to be received by said bottom housing member when rotated.

6. A weatherproof telephone station protector module, according to claim 5, wherein said bolt is provided with an insulated head having an aperture exposing said bolt head, thereby providing electrically conductive contact with said electrically conductive contact means.

7. A weatherproof telephone station protector module, according to claim 1, further including:

a) overvoltage protection means and a back-up air gap disposed within the hollow of said lower housing member, said overvoltage protection means having three terminals, the first terminal of said overvoltage protection means being connected to one of said electrically conductive contact means, the second terminal thereof being connected to another of said electrically conductive contact means and the third terminal thereof being coupled to the ground terminal means, via a back-up air gap, b) a pair of back-up air gaps, one of said back-up air gaps being disposed between said ground terminal means and said first terminal of said overvoltage protection means and the other back-up air gap being disposed between said ground terminal means and said second terminal of said overvoltage protection means, and c) means for removably retaining said overvoltage protection means, said removable retaining means having one end of a first portion in electrically conductive contact with said first terminal of said overvoltage protection means and one end of a second portion in electrically conductive contact with said second terminal of said overvoltage protection means, the other ends of said first and said second portions of said retaining means being in electrically conductive contact with one of said electrically conductive contact means, the other end of said retaining means being in electrically conductive contact with the other of said electrically conductive contact means;

whereby, when said upper member is inserted into said lower member, and said bolt is inserted into said upper member third through aperture into said lower member first through aperture and rotated, said insulated wires inserted into each of said electrically conductive contact means, via said at least one of said fourth through apertures disposed on said parallel side surfaces of said upper housing members, become in electrically conductive contact with each other.

8. A weatherproof telephone interface module according to claim 7, wherein said retaining means includes insulation means for insulating said retaining means from said ground terminal.

9. A weatherproof telephone interface module according to claim 8, wherein said insulation means is a thermally sensitive material that shorts said retaining means to said ground terminal means should the temperature exceed the melting point of said thermally sensitive material.

10. A weatherproof telephone interface module, according to claim 7, wherein said terminal assemblies are provided with apertures suitable for receiving insulated wires of more than one size.

11. A weatherproof telephone interface module, according to claim 7, wherein said bolt is captive in said top surface of said upper hollow housing and said upper housing member is removably retained by said lower housing member.

12. A weatherproof telephone interface module, according to claim 1, wherein said ground terminal extends outwardly from said rear surface of said bottom member.

13. A weatherproof telephone interface module, according to claim 7, wherein said overvoltage protection means is a solid state semiconductor device.

14. A weatherproof telephone interface module, according to claim 1, further including an insulated band member disposed over the wire receiving apertures disposed on each said terminal assembly.

15. A weatherproof telephone interface module, according to claim 1, further including a resilient O-ring disposed between said upper housing member and said lower housing member to provide a waterproof seal therebetween.

16. A weatherproof telephone interface module, according to claim 7, wherein said ground terminal extends outwardly from said rear surface of said bottom member.

17. A weatherproof telephone interface module, according to claim 7, further including an insulated band member disposed over the plurality of wire receiving apertures disposed on each said terminal assembly.

18. A weatherproof telephone interface module, according to claim 7, further including a resilient O-ring disposed between said upper housing members and said lower housing member to provide a waterproof seal therebetween.

19. A weatherproof telephone interface module, according to claim 7, further including a pair of resilient pads affixed on said upper housing member having reduced apertures placed in alignment with said insulated wire receiving apertures for providing a waterproof seal for said apertures.

20. A weatherproof telephone interface module, according to claim 11, further including a pair of resilient pads affixed on said upper housing member having reduced apertures placed in alignment with said insulated were receiving apertures for providing a waterproof seal for said apertures.

21. A weatherproof telephone interface module, according to claim 11, wherein said lower hollow housing member is provided with an open bottom.

22. A weatherproof telephone interface module, according to claim 21, wherein said lower hollow housing is provided with means for sealing said open bottom.

23. A weatherproof telephone interface module, according to claim 22, wherein said lower hollow housing sealing means is a cover.

24. A weatherproof telephone interface module, according to claim 22, wherein said lower hollow housing sealing means is potting material.

25. A weatherproof telephone station protector module suitable for outside use exposed to the weather comprising:

A. an elongated lower hollow housing member having a longitudinal axis and a transverse axis, a top surface including, a) a pair of terminal assemblies disposed thereon, b) a pair of through apertures, disposed proximate the edges of said lower housing member, adapted to cooperate with said terminal assemblies, and c) front and rear surfaces disposed parallel to said longitudinal axis, said front and rear surfaces being provided with an elongated through aperture, B. each said terminal assembly including;

a) a hollow, rectangularly shaped upper housing member having, i) a top surface and an open bottom, said top surface being provided with a generally centrally disposed through aperture, said upper housing member being adapted to cooperate with and be removably retained by said lower housing member, ii) two parallel side surfaces disposed parallel to said transverse axis provided with a plurality of through apertures, and iii) the other two parallel side surfaces being provided with an outwardly extending protrusion adapted to cooperate with said bottom member elongated through aperture; and b) a generally U-shaped electrically conductive contact, when viewed in cross-section, having i) a pair of arm portions connected to a base portion, each of said pair of arm portions being provided with at least one cutting slot adapted to receive an electrically conductive insulated wire therein, ii) said base portion connected at the distal edges thereof to said arm portions has a generally centrally disposed through aperture; and c) a hollow electrically conductive feedthrough having internal threads on one end, said one end being adapted to be retained by said lower housing member through aperture disposed proximate the edges of said lower member and said through aperture of said U-shaped base portions of said conductive contacts, so that said upper housing member and said lower housing member are in alignment; and C) bolt means adapted to be received into said generally centrally disposed through aperture of said upper housing member and be received by said threaded one end of said threaded feedthrough disposed in said lower housing member and cooperate therewith for urging said top housing towards said lower housing member;

wherein, when electrically conductive insulated wires are inserted into said side through apertures of said upper housing member into said cutting slots of said U-shaped contact an electrically conductive path is completed therebetween upon urging said upper housing member and said lower housing member together.

26. A weatherproof telephone station protector module suitable for outside use exposed to the weather, according to claim 25, further including resilient washer means disposed beneath the bottom edges of said terminal assembly when received by said lower member.

27. A weatherproof telephone station protector module suitable for outside use exposed to the weather, according to claim 25, wherein said upper housing member of said terminal assembly is adapted to be received into said lower housing member.

28. A weatherproof telephone station protector module according to claim 25, wherein said arms of said U-shaped electrically conductive contact has distal extending ends, said ends being provided with ledges adapted to cooperate with ledges provided on said upper housing member of said terminal assembly to prevent said upper housing member from shearing said electrically conducting wires.

29. A weatherproof telephone station protector module according to claim 25, wherein said bolt means is held captive within said upper housing member and said upper housing member is held captive within said lower housing member, said captive bolt means being adapted to be inserted into said generally centrally disposed through aperture of said upper housing member, be received by said internally threaded feedthrough disposed in said lower housing member and cooperate therewith for urging said top housing member to be received by said bottom housing member when rotated.

30. A weatherproof telephone station protector module, according to claim 29, wherein said bolt means is provided with an insulated head having a generally centrally disposed aperture exposing said bolt head, thereby providing electrically conductive contact with said shorting terminal.

31. A weatherproof telephone station protector module, according to claim 25, further including:

a) overvoltage protection means and a back-up air gap disposed within the hollow of said lower housing member, said overvoltage protection means having three terminals, the first terminal of said overvoltage protection means being connected to one of said shorting terminals, the second terminal thereof being connected to the other of said shorting terminals and the third terminal thereof being coupled to said ground terminal means, via a back-up air gap, b) a pair of back-up air gaps, one of said back-up air gaps being disposed between said ground terminal means and said first terminal of said overvoltage protection means and the other back-up air gap being disposed between said ground terminal means and said second terminal of said overvoltage protection means, and c) first and second holding bracket means for removably retaining said overvoltage protection means, the first holding bracket means being in electrically conductive contact with said first terminal of said overvoltage protection means and the second holding bracket means being in electrically conductive contact with said second terminal of said overvoltage protection means, one end of said first and said second holding bracket means being in electrically conductive contact with one of said shorting terminals, the other end of said holding bracket means being in electrically conductive contact with the other of said shorting terminals;

whereby, when said upper members are inserted into said lower member, said threaded bolt is inserted into said upper member through aperture into said lower member threaded eyelets and rotated, said insulated wires inserted into each said shorting terminals, via said plurality of through apertures disposed on said parallel side surfaces of said upper housing members, become in electrically conductive contact with each other.

32. A weatherproof telephone interface module according to claim 31, wherein said holding bracket means includes insulation means for insulating said pair of holding brackets from said ground terminal.

33. A weatherproof telephone interface module according to claim 32, wherein said insulation means is a thermally sensitive material that shorts said holding brackets to said ground terminal means should the temperature exceed the melting point of said thermally sensitive material.

34. A weatherproof telephone interface module, according to claim 31, wherein said terminal assemblies are provided with apertures suitable for receiving insulated wires of more than one size.

35. A weatherproof telephone interface module, according to claim 31, wherein said bolt is captive in said top surface of said hollow housing and said top members are removably retained by said bottom member.

36. A weatherproof telephone interface module, according to claim 25, wherein said ground terminal extends outwardly from said rear surface of said bottom member.

37. A weatherproof telephone interface module, according to claim 31, wherein said overvoltage protection means is a solid state semiconductor device.

38. A weatherproof telephone interface module, according to claim 25, further including an insulated band member disposed over the plurality of wire receiving apertures disposed on each said terminal assemblies.

39. A weatherproof telephone interface module, according to claim 25, further including a resilient O-ring disposed between said upper housing members and said lower housing member to provide a waterproof seal therebetween.

40. A weatherproof telephone interface module, according to claim 31, wherein said ground terminal extends outwardly from said rear surface of said bottom member.

41. A weatherproof telephone interface module, according to claim 31, further including an insulated band member disposed over the plurality of wire receiving apertures disposed on each said terminal assemblies.

42. A weatherproof telephone interface module, according to claim 31, further including a resilient O-ring disposed between said upper housing members and said lower housing member to provide a waterproof seal therebetween.

43. A weatherproof telephone interface module, according to claim 31, further including a pair of resilient pads affixed on said upper housing member, said pads having reduced apertures placed in alignment with said insulated wire receiving apertures for providing a waterproof seal for said apertures.

44. A weatherproof telephone interface module, according to claim 25, further including a pair of resilient pads affixed on said upper housing member, said pads having reduced apertures placed in alignment with said insulated wire receiving apertures for providing a waterproof seal for said apertures.

* * * * *